No. 773,753. PATENTED NOV. 1, 1904.
K. M. KIMBROUGH.
LISTER CULTIVATOR.
APPLICATION FILED JUNE 17, 1904.
NO MODEL. 2 SHEETS—SHEET 1.

Witnesses
F. R. Glow
H. C. Rodgers

Inventor
K. M. Kimbrough
By George F. Thorpe Atty.

No. 773,753. PATENTED NOV. 1, 1904.
K. M. KIMBROUGH.
LISTER CULTIVATOR.
APPLICATION FILED JUNE 17, 1904.
NO MODEL. 2 SHEETS—SHEET 2.

Witnesses
F. R. Glow
H. C. Rodgers

Inventor
K. M. Kimbrough
By George Y. Thorp atty.

No. 773,753.

Patented November 1, 1904.

UNITED STATES PATENT OFFICE.

KELSE M. KIMBROUGH, OF HARDIN, MISSOURI.

LISTER-CULTIVATOR.

SPECIFICATION forming part of Letters Patent No. 773,753, dated November 1, 1904.

Application filed June 17, 1904. Serial No. 212,942. (No model.)

*To all whom it may concern:*

Be it known that I, KELSE M. KIMBROUGH, a citizen of the United States, residing at Hardin, in the county of Ray and State of Missouri, have invented certain new and useful Improvements in Lister-Cultivators, of which the following is a specification.

This invention relates to lister-cultivators of that type provided with disks for turning the soil and wheels or rollers for supporting the machine when the disks are raised; and my object is to produce an efficient and reliable machine of this character which will tend to facilitate the growth of the plants cultivated by crushing practically all of the clods which might pack upon the plants and either kill them or stunt their growth.

A further object is to produce a machine of this character which is simple, strong, durable, and inexpensive of construction and which can be easily manipulated and controlled by the driver.

With the above objects in view the invention consists in certain novel and peculiar features of construction and combinations of parts, as hereinafter described and claimed, and in order that it may be fully understood reference is to be had to the accompanying drawings, in which—

Figure 1:
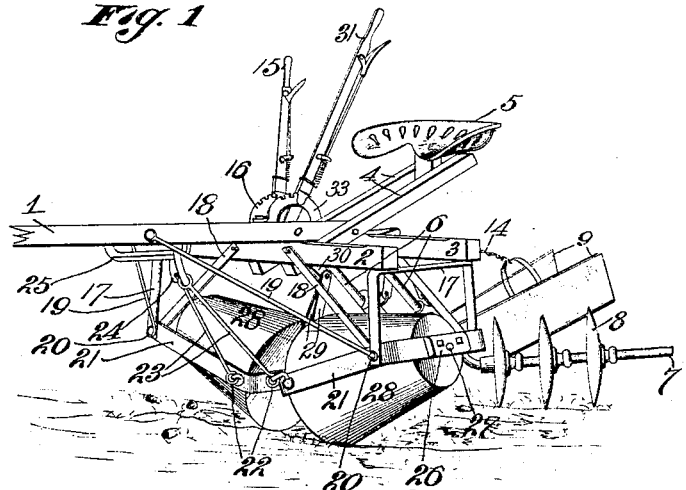
Figure 2:
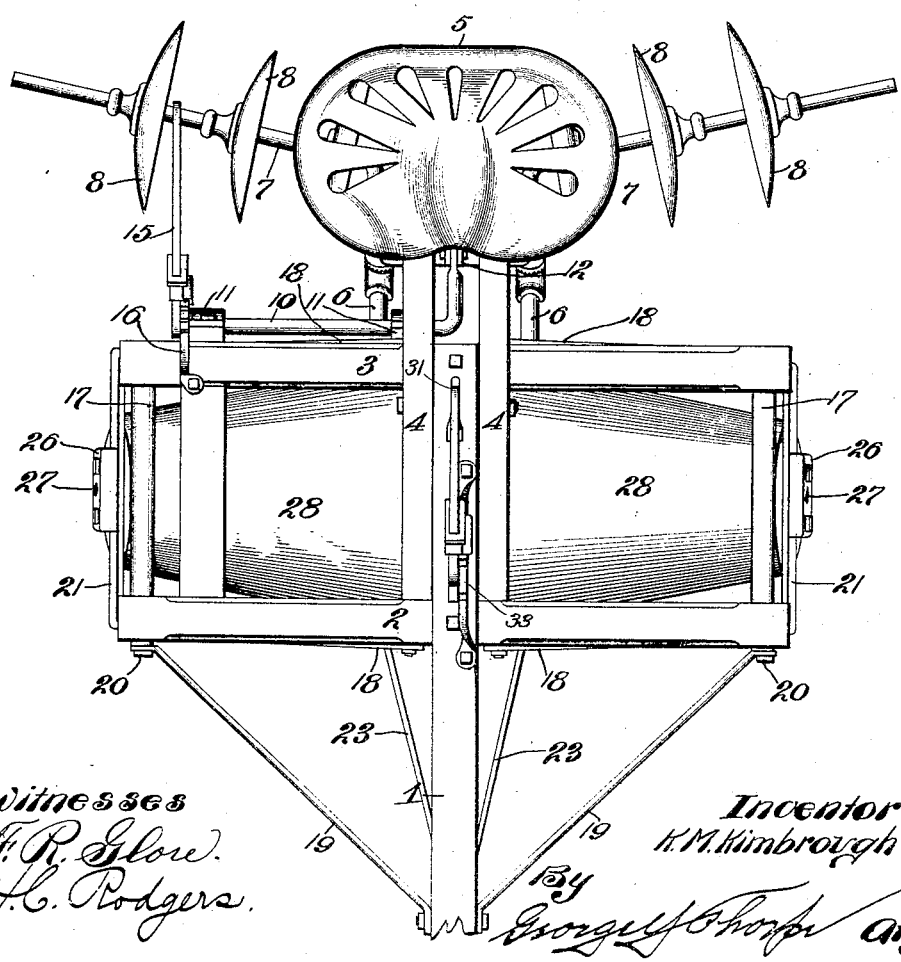
Figure 3:
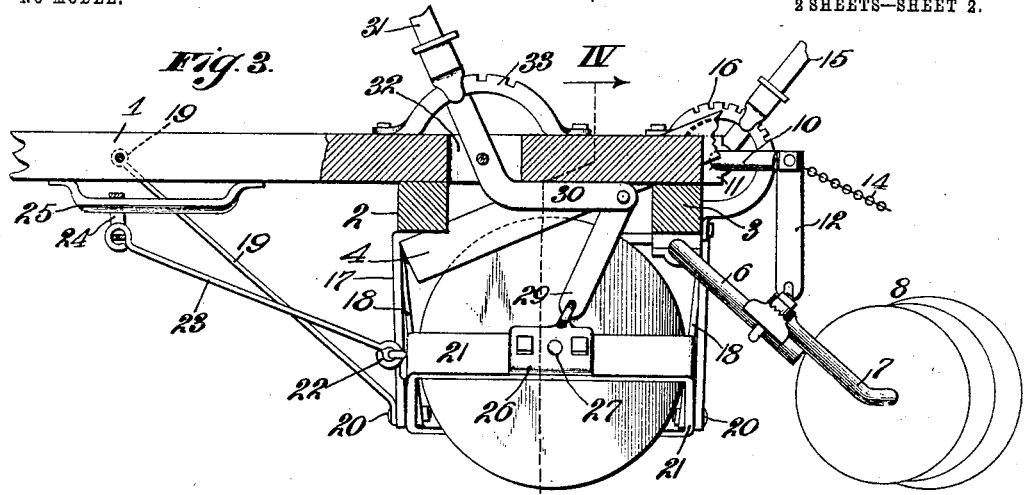
Figure 4:
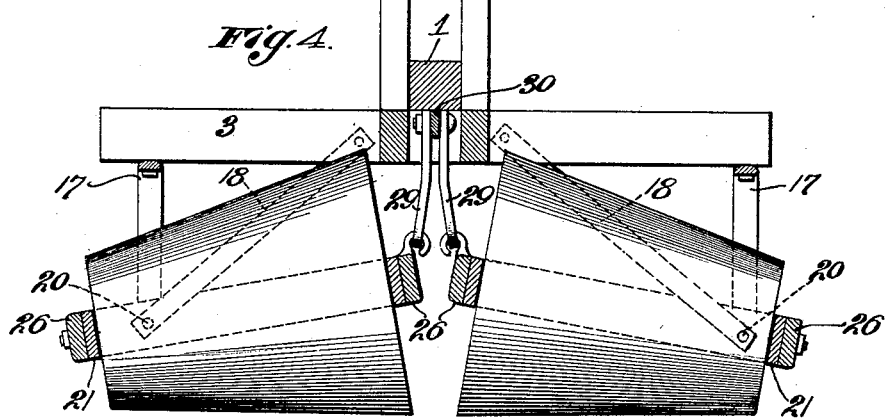
Figure 5:
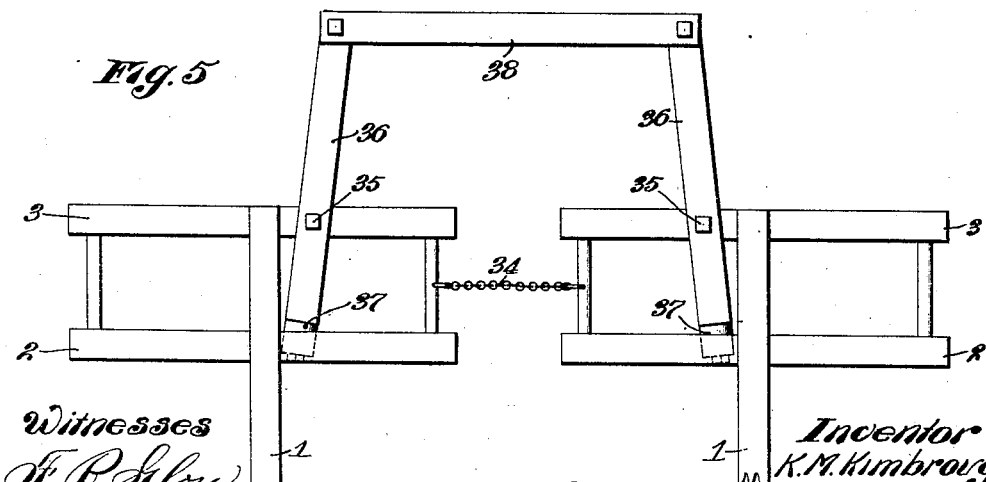

Figure 1 is a perspective view of a single gang of a two-row lister-cultivator embodying my invention and disposed for the cultivating operation. Fig. 2 is a top plan view on a larger scale, but with the fender omitted. Fig. 3 is a central longitudinal section with the rollers arranged properly for traveling to and from the field. Fig. 4 is a cross-section taken on the line IV IV of Fig. 3. Fig. 5 is a top plan view of the framework of both gangs and the adjustable connection between them.

As the gangs are duplicates, a description of one will suffice for both.

The main framework consists of the tongue 1, front cross-bar 2, and rear cross-bar 3, said cross-bars being secured to the under side of the tongue in any suitable manner.

4 4 designate bars bolted to opposite sides of the tongue and bearing at their front ends against the under side of cross-bar 2. They also bear upon the cross-bar 3 and support the seat 5 at their upper or rear ends in any suitable or preferred manner.

Supported from the rear portion of said main frame, as shown, or in any other suitable or preferred manner, are arms 6, to which are adjustably secured angle-arms 7, each equipped with one or more cultivating-disks 8, and also supported in any suitable manner centrally between said disk-carrying arms is the usual or any preferred fender 9 to guard and protect the plants while being cultivated. A crank-shaft 10, journaled in bearings 11, by preference secured to the rear bar 3, is linked, as at 12, to the disk-carrying arms in order that the disks may be raised when desired or forced into the ground, the fender being also connected, as at 14, to the crank-shaft to be lifted to inoperative position when the disks are raised. The crank-shaft 10 is equipped at one end with a lever 15 within convenient reach of the driver upon the seat, and said lever is provided with the usual latch mechanism for engagement with a notched sector 16, secured to the main frame, the latch mechanism and sector serving to hold the cultivating mechanism and fender at the required point of adjustment.

17 designates a pair of inverted-U frames rigidly connecting the ends of bars 2 and 3 and depending vertically therefrom, and said frames are braced from movement transversely by braces 18, secured at their lower ends to the frames and at their upper ends to bars 2 and 3. The frames 17 are braced from movement longitudinally of the machine by means of braces 19, secured at their lower ends to said frames and at their upper ends to opposite sides of the tongue.

20 represents bolts secured to the lower ends of frames 17 and forming by preference the connection between said frames and the lower ends of braces 18 and 19, and pivoted on said bolts within said frames are rectangular frames 21, the inner front corners of said frames being pivotally connected, as at 22, to upwardly and forwardly converging links 23, said links being pivoted at their upper ends to an inverted-U-shaped clip 24, slidingly engaging a longitudinal bracket 25, secured to the under side of the tongue.

26 designates boxes secured to the ends of each frame to provide proper bearings for the shafts or spindles 27 of conoidal rollers 28, the ends of the greatest diameter of the rollers being contiguous, and pivotally connected to the shafts at the inner ends of said frames are short links 29, pivotally connected at their upper ends to the foot portion 30 of a lever 31, pivoted to the tongue and extending up through a slot 32 thereof, said lever having the usual latch mechanism for engagement with a notched sector 33, secured to the tongue, the arrangement being such that forward movement of the lever results in raising the inner or larger ends of the frames, and therefore the rollers, and rearward movement of the lever in the depression of the inner ends of the frames and rollers, the frames operating upon pivot-bolts 20. As the frames and rollers are raised, as described, clip 24 slides forward on bracket 25, said clip movement being reversed when the rollers are lowered, and when the latter occupy their most depressed positions the clip engages the rear end of said bracket and in conjunction with links 23 braces the inner ends of said rollers against rearward movement.

In the cultivating operation the parts are arranged as shown in Fig. 1, except that the fender is lowered instead of being raised, as shown, the pitch of the lower surface of the rollers corresponding approximately to the sides of the furrow in order that clods in the banks of the furrow may be crushed. The rollers, furthermore, by rolling upon the banks for their full width serve to remove irregularities from their surface to the end that the disks traveling in the rear of and slightly deeper than the rollers shall turn a volume of earth toward the plants which is practically uniform from one end of the furrow to the other, the fender, as usual, preventing or guarding against the plants being smothered by the soil turned in such operation.

In traveling to and from the field the driver manipulates lever 31, so as to raise the rollers to approximately the position shown in Fig. 4, and thus bring their lower surfaces in substantially a horizontal plane, the cultivating-disks and fender being also raised a suitable distance above the ground by means of lever 15. Of course the machine may be driven to or from the field with the rollers in the position shown in Fig. 1; but if so there will be more draft on the horses, because said rollers would be embedded more or less in the soft ground over which they passed, and, furthermore, would drop into small ruts instead of bridging them, as they would if disposed as in Fig. 4.

When used as a two-row machine, the gangs may be connected by any of the usual seat-plank connections common in the art; but I prefer to connect the frames 17 of the contiguous gangs by a chain 34 to limit the distance apart which said gangs may move, as shown in Fig. 5. I also prefer to pivot, as at 35, upon bars 3 the rock-bars 36, providing said rock-bars at their front ends with rollers 37 to roll against the under sides of bars 2, the rear ends of the rock-bars being pivotally connected by a cross-plank 38, adapted to support a seat (not shown) at its middle in any suitable or preferred manner. With this construction it will be seen that the gangs are free to move toward or from each other, and, furthermore, have independent forward and rearward movement in case one team travels faster than the other at any time.

If desired, the machine can be operated without latching the lever which controls the position of the rollers, so as to leave the same free to accommodate themselves to irregularities in the surface of the ground, the connection between the inner ends of the rollers being sufficiently loose to allow the rollers to play vertically in opposite directions, so that one may pass over a rise and the other through a hollow portion at the same time without interfering with the proper operation of the cultivating appliances.

From the above description it will be apparent that I have produced a lister-cultivator embodying the features of advantage enumerated as desirable in the statement of invention, and while I have illustrated and described the preferred embodiment of the machine it is to be understood that the invention may be modified in various particulars without departing from the principle of construction involved.

Having thus described the invention, what I claim as new, and desire to secure by Letters Patent, is—

1. In a lister-cultivator, the combination of a tongue and cross-bars secured thereto; frames pivotally supported at their outer ends from said cross-bars and adapted for movement in a vertical plane; transversely-extending rollers journaled in said pivoted frames; a lever pivoted above its lower end to the tongue; links pivotally connecting the lower end of said lever with the inner ends of the pivoted frames; and means for securing the lever rigidly at the desired point of adjustment to lock the rollers from pivotal movement.

2. In a lister-cultivator, a main frame, frames pivotally supported at their outer ends below and from the main frame, and adapted for vertical movement, transversely-extending rollers journaled in said pivoted frames, a longitudinal bracket secured to the main frame, a clip slidingly engaging said bracket, links pivotally connecting said clip with the inner portions of said pivoted frames, and means for raising and lowering the inner ends of said frames.

3. In a lister-cultivator, a main frame, frames pivotally supported at their outer ends below and from the main frame, and adapted for vertical movement, transversely-extending rollers journaled in said pivoted frames, a longitudinal bracket secured to the main frame, a clip slidingly engaging said bracket, links pivotally connecting said clip with the inner portions of said pivoted frames, means for raising and lowering the inner ends of said frames, and means for securing said frames at the desired point of adjustment.

4. In a lister-cultivator, a frame, comprising a tongue and cross-bars secured thereto; inverted-U frames depending from the ends of the cross-bars and suitably braced; frames pivoted at their outer ends to the lower ends of the U-frames; transversely-extending rollers journaled in such pivoted frames; a lever pivoted to a fixed part of the framework; links pivotally connecting said lever with the inner ends of the pivoted frames, and means for locking said lever at the desired point of adjustment.

5. In a lister-cultivator, a main frame, frames pivotally supported at their outer ends below and from the main frame and adapted for vertical movement, transversely-extending conoidal rollers journaled in said pivoted frames and having their large ends contiguous, a longitudinal bracket secured to the main frame, a clip slidingly engaging said bracket, links pivotally connecting said clip with the inner portions of said pivoted frame, and means for raising and lowering the inner ends of said frames.

6. A lister-cultivator, comprising a main frame, transverse frames pivotally supported at their outer ends from and below the main frame, rollers journaled in said frames, and means for raising and lowering the inner ends of said frames and rollers, in combination with cultivating appliances rearward of said rollers, a fender arranged centrally of the machine and between said cultivating appliances, and means for raising and lowering said cultivating appliances and fender.

7. A lister-cultivator, comprising a main frame, transverse frames pivotally supported at their outer ends from and below the main frame, conoidal rollers journaled in said frames and having their inner or larger ends contiguous, and means for raising and lowering the inner or contiguous ends of said frames and rollers, in combination with cultivating appliances rearward of said rollers, a fender arranged centrally of the machine and between said cultivating appliances, and means for raising and lowering the cultivating appliances and fender.

8. A lister-cultivator, comprising a pair of main frames, transverse frames pivotally supported at their outer ends from and below the outer ends of their respective main frames, rollers journaled in said pivoted frames, means for raising and lowering the inner ends of said frames, a flexible connection between said main frames, rock-bars mounted on the main frames, and a seat-plank connecting the rear ends of said rock-bars.

9. A lister-cultivator, comprising a pair of main frames, transverse frames pivotally supported at their outer ends from and below the outer ends of their respective main frames, rollers journaled in said pivoted frames, means for raising and lowering the inner ends of said frames, a flexible connection between said main frames, rock-bars pivoted on the main frames and provided with rollers engaging the inner sides of the latter, and a seat-plank pivotally connecting the rear ends of the rock-bars.

In testimony whereof I affix my signature in the presence of two witnesses.

KELSE M. KIMBROUGH.

Witnesses:
W. C. KIMBROUGH,
WILLIAM HOWE.